United States Patent [19]
Holiday

[11] Patent Number: 5,498,317
[45] Date of Patent: Mar. 12, 1996

[54] APPARATUS FOR TREATING CHEMICAL PRODUCTION PLANT PROCESS CONDENSATE

[75] Inventor: Allan D. Holiday, Overland Park, Kans.

[73] Assignee: Farmland Industries, Inc., Kansas City, Mo.

[21] Appl. No.: 323,855

[22] Filed: Oct. 17, 1994

Related U.S. Application Data

[62] Division of Ser. No. 116,863, Sep. 3, 1993, Pat. No. 5,385,646.

[51] Int. Cl.$^6$ .................................... B01D 3/26; B01J 8/00
[52] U.S. Cl. ........................ 202/154; 202/161; 202/181; 202/186; 203/1; 203/11; 203/12; 203/14; 203/75; 203/77; 203/82; 203/87; 203/94; 203/98; 203/DIG. 6; 422/187; 423/352; 568/913
[58] Field of Search ...................................... 202/234, 153, 202/154, 161, 186; 203/10, 11, 14, 12, 98, DIG. 6, 87, 75, 76, 77, 82, 96, 95, 92, 93, 94; 423/352, 359; 568/913; 518/705, 704; 422/187

[56] References Cited

U.S. PATENT DOCUMENTS

| | | |
|---|---|---|
| 2,519,451 | 8/1950 | Fulton ............................... 203/76 |
| 3,011,969 | 12/1961 | Madar . |
| 3,404,072 | 10/1968 | Bollen et al. . |
| 3,518,166 | 6/1970 | Klett . |
| 3,636,106 | 1/1972 | Villiers-Fisher . |
| 3,922,222 | 11/1975 | Van Moorsel . |
| 4,110,087 | 8/1978 | Nolley, Jr. . |
| 4,138,434 | 2/1979 | Lagana et al. . |
| 4,155,804 | 5/1979 | Edge, Jr. . |
| 4,235,816 | 11/1980 | Lagana et al. . |
| 4,260,462 | 4/1981 | Didyez et al. . |
| 4,321,410 | 3/1982 | Ono et al. . |
| 4,330,307 | 5/1982 | Coury . |
| 4,347,385 | 8/1982 | Scoggin . |
| 4,376,758 | 3/1983 | Pagani et al. . |

(List continued on next page.)

OTHER PUBLICATIONS

System Curbs Nitrogen in Plant–Effluent Streams, Chemical Engineering, Aug. 14, 1978, p. 93.
Combined Treatment of Ammonia/Urea Process Condensates, R. B. Strait, The M. W. Kellog Company, presented at the Gulf Coast Ammonia Producers Meeting, Apr. 6, 1993.
Control of Effluent in an Integrated Nitrogen Fertilizer Complex, Allan D. Holiday, Cooperative Farm Chemicals Association, presented at The Fertilizer Institute Environmental Symposium, Mar. 1978.

Primary Examiner—Wilbur Bascomb, Jr.
Attorney, Agent, or Firm—Kokjer, Kircher, Bowman & Johnson

[57] ABSTRACT

An apparatus and method for treating chemical production plant process condensate such that a contaminant-rich stream and a relatively pure aqueous stream is separately recoverable from the condensate, wherein the contaminants are substantially removed from the condensate by steam stripping and subsequent rectification in a relatively low pressure stripping/rectification tower. The tower overhead is then condensed with a portion of the condensed overhead being returned to the top of the rectification section of the tower as reflux and the balance being withdrawn as a concentrated stream for reuse in the plant. In a second embodiment, separate stripping and rectification towers operate in series whereby the overhead of the stripping tower is delivered to the lower section of the rectification tower and the rectification bottoms are returned to the top of the stripping tower. The overhead from the rectification tower is then condensed with a portion returned at its top for reflux and the remainder being withdrawn as a highly concentrated stream for recycling to the ammonia plant. The mass flow to the ammonia plant is low enough because of high concentration that ammonia plant modifications are not needed nor is there significant thermal impact. The apparatus may be used in conjunction with existing low pressure equipment, avoiding costly major modifications.

34 Claims, 3 Drawing Sheets

U.S. PATENT DOCUMENTS

| | | |
|---|---|---|
| 4,422,903 | 12/1983 | Messick et al. . |
| 4,444,571 | 4/1984 | Matson . |
| 4,464,228 | 8/1984 | Roensch . |
| 4,522,979 | 11/1985 | Stokes . |
| 4,539,077 | 9/1985 | Jonckers et al. . |
| 4,566,947 | 1/1986 | Tsuruta . |
| 4,587,373 | 5/1986 | Hsia . |
| 4,594,131 | 6/1986 | Maier . |
| 4,613,697 | 9/1986 | Pagani . |
| 4,632,676 | 12/1986 | Mosebach et al. . |
| 4,693,883 | 9/1987 | Fleming . |
| 4,801,356 | 1/1989 | Grasso . |
| 5,011,625 | 4/1991 | LeBlanc . |
| 5,073,669 | 12/1991 | Forte . |
| 5,167,773 | 12/1992 | Eagan et al. . |
| 5,170,630 | 12/1992 | Stern . |

APPARATUS FOR TREATING CHEMICAL PRODUCTION PLANT PROCESS CONDENSATE

This is a division of application Ser. No. 08/116,863, filed Sep. 3, 1993 now U.S. Pat. No. 5,385,646

BACKGROUND OF THE INVENTION

1. Field of the Invention

The present invention is generally related to industrial chemical production plants and waste water treatment, and is more specifically directed to a novel apparatus configuration and method for using the same to recover raw materials, by-products and product from the dilute process condensate streams of chemical production plants. The recovered materials are recycled for use in the production facilities in such a manner as to avoid any significant energy or other efficiency penalties which could negatively impact the plant's operation and overall effectiveness.

2. Description of the Related Art

Large quantities of industrial waste water are daily produced by chemical production and processing plants within the United States and throughout the world. Often times, this waste water is process condensate consisting of dilute streams of raw materials, byproducts and product remaining unrecovered from processing water and/or steam used in various phases of production. For example, in the production of ammonia, steam exiting the plant after use in stripping operations carries trace amounts of methanol, ammonia, carbon dioxide, alkylamines and the like. Although the materials within these streams could be utilized to form product, due to the dilute nature of the condensate, it is generally more cost efficient to simply consider the water as waste water and dispose of the same as needed.

At one time, the bulk of process condensate and industrial waste water was simply discharged into live streams or municipal sewer systems without treatment. However, in view of the potential environmental damage that could result from the release of chemicals into the water systems, as well as the need to conserve the amount of water used daily in operations, methods have been developed for treating the water to remove any contaminants therefrom and recycle the water back to phases of the plant for reuse.

In the field of ammonia production, for example, it is known to use a relatively low pressure steam stripping apparatus such as a conventional stripping tower to treat the process condensate, wherein steam is utilized to strip the contaminates from the condensate. The contaminated overhead is then vented to the atmosphere while the stripped condensate is reused in the plant as cooling tower water make-up, boiler feed water make-up and the like. Alternatively, the contaminated overhead may be destroyed or decomposed such as by burning. Although these conventional low pressure strippers are useful for this purpose, the amount of contaminants and/or noxious vapors vented to the atmosphere is undesirable. In fact, the type and amount of such emissions is the subject of increasingly stringent regulation by the Environmental Protection Agency (EPA), as well as other state and local officials. It is anticipated that the level of emissions now permitted will be substantially reduced in the future, particularly as to potentially harmful compounds such as ammonia and methanol, and will perhaps eventually be prohibited altogether.

In order to overcome these emission problems, a more recently developed method of treating ammonia plant process condensate utilizes relatively high pressure condensate stripping towers, generally operating at 500 pounds pressure (psi) or more to strip contaminants from the condensate. In this method, the high pressure process steam carries the contaminated stripper overhead back to the plant for use in the primary reformer stage of production. Although return of the contaminates to the ammonia plant avoids undesirable venting of contaminants into the atmosphere, injection of the relatively high pressure stream of overhead into the plant requires that it be flow controlled and be considered along with the normal steam flow to the primary reformer in setting the steam-to-gas ratio. This has the effect of lowering the front-end pressure of the system, lowering ammonia plant capacity and efficiency as well as complicating process control overall. In addition, the high pressure strippers are relatively very expensive and their use requires the complete replacement of the more conventional low pressure strippers that are presently used in many plants throughout the world.

Therefore, it is a primary object of the present invention to provide an apparatus and method of treating chemical plant process condensate, wherein the raw materials, product and byproducts (hereinafter referred to collectively as "contaminants") in the condensate are recovered from the water for reuse in the plant.

It is another object of the present invention to provide an apparatus and method of treating process condensate, wherein contaminants in the condensate can be recovered and returned to the plant without accruing significant efficiency penalties to the plant or requiring plant modification.

It is another object of the present invention to provide an apparatus and method of treating process condensate, wherein a conventional low pressure steam stripping tower may be utilized.

Another object of the present invention is to provide an apparatus and method of treating process condensate, wherein a plant using a conventional low pressure steam stripping tower for condensate treatment can be retro-fitted to enable the concentrating and recycling of recovered contaminants back to the plant.

It is another object of the present invention to provide an apparatus and method of treating process condensate that is relatively efficient and cost effective.

A further object of the present invention is to provide an apparatus and method of treating process condensate wherein contaminant air emissions are effectively eliminated.

Yet another object is to provide an apparatus and method of treating process condensate, wherein a substantial amount of the water in the condensate can be recovered having a reduced contaminant content so as to be suitable for reuse in the plant as boiler feedwater make-up which requires high quality, low conductivity water.

Yet a further object of the present invention is to provide an apparatus and method of treating ammonia and/or methanol plant process condensate meeting the objectives heretofore described.

SUMMARY OF THE INVENTION

These and other objects are achieved by a novel apparatus configuration and method of using the same to recover product, by-products and raw materials from the process condensate of a chemical production plant. The method comprises stripping the contaminants from the condensate in a relatively low pressure stripping section of an upright tower to obtain a contaminant-rich overhead vapor and an aqueous bottom stream of reduced contaminant content, followed by rectification in a rectification section of the tower to obtain a concentrated overhead stream. The tower overhead is then totally condensed with a portion of the condensed overhead stream being returned to the top of the rectification section of the tower as reflux, and the balance is withdrawn as a concentrated stream for re-use in the plant.

Due to the low volume nature of the concentrated overhead stream withdrawn, the contaminants can be efficiently injected back into the plant at the appropriate stage for decomposition, recycling and/or reuse within the plant without significant thermal, pressure or energy impact on the plant and its operation, thus requiring no plant modification or accrueing significant efficiency penalties. As with other stripping operations, the stripped condensate is removed from the tower as bottoms liquid which may also be recycled such as for use as boiler feed water and/or cooling tower water make-up and the like.

In an alternative embodiment, separate stripping and rectification columns operating in series are provided, whereby the overhead vapor of the stripping column is delivered to the base of the rectification column. The rectification bottoms are returned to the top of the stripping tower for further stripping action. The concentrated overhead from the rectification column is then totally condensed with a portion returned to the top of the rectification column as reflux and the remainder being withdrawn as a concentrated stream for recycling to the chemical production plant.

The method and apparatus configuration of this invention can be utilized in conjunction with conventional low pressure steam strippers, such as those previously used for treating ammonia plant process condensate, by retrofitting the existing stripping tower to include a rectification section at its top or by adding a separate rectification column in series. Not only does the retrofitted system eliminate the environmental concerns associated with the prior technique of venting contaminates, it enables substantially the whole of the process condensate contaminates generated by the plant to be converted into feed stock which can be recycled to the production facility for use.

This apparatus and method achieve a marked improvement in the overall economics and operation of the chemical production plant complex, making it possible to obtain the advantages now associated with relatively high pressure strippers while avoiding the enormous costs associated with such systems, and the energy and pressure penalties which necessarily accrue to the production plant via their use.

DETAILED DESCRIPTION OF THE INVENTION

The present invention is directed to a novel method and unique apparatus configuration for treating chemical production plant process condensate. The process condensate treated may generally include any effluent generated by chemical production and processing operations, and will normally comprise a dilute aqueous stream of the raw materials utilized in processing, as well as product and by-products formed in various stages of production. For purposes of this application the product, by-product and raw materials contained in the condensate shall be referred to collectively as "contaminants". Depending upon the nature of the processing steps from which the condensate is generated, this effluent may be presented for treatment in the form of a gaseous or liquid stream. The condensate may be used at its recovery temperature without preliminary treatment and will preferably have a temperature ranging near its bubble point for the stripping operation pressure as hereafter described.

Figure 1:
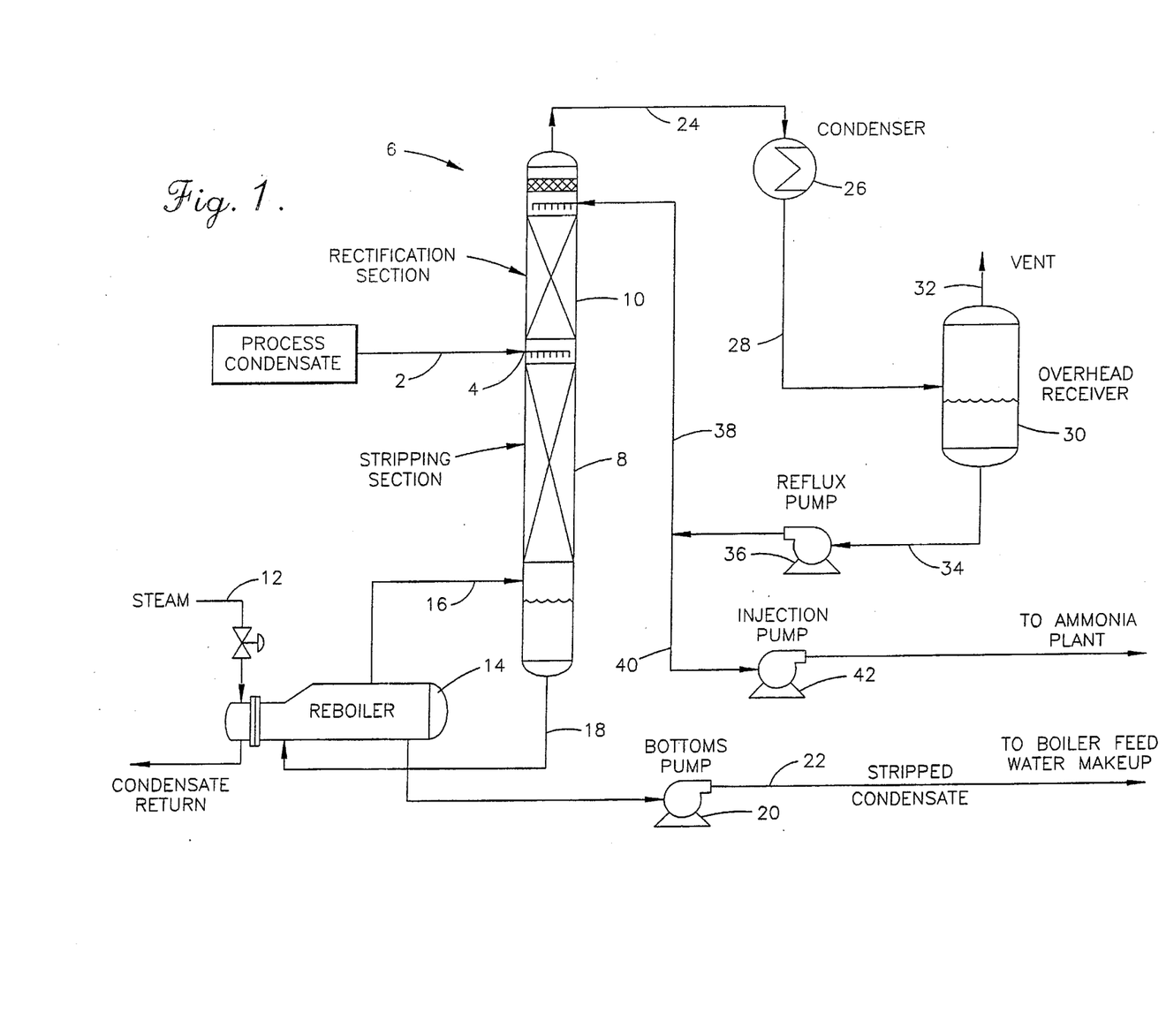
FIG. 1 is a schematic representation of an apparatus configuration having a common tower for stripping and rectification in accordance with the present invention.

Referring now to the embodiment shown in FIG. 1, a process condensate stream from a chemical production plant is fed via line 2 to an entry port 4 in the midsection of an upright cylindrical tower 6 having a closed top and bottom. Tower 6 comprises a lower stripping section 8 and an upper rectification section 10. The tower is of conventional construction, preferably a countercurrent tower of the bubble-plate or packed type operable at relatively low pressures ranging generally from 0 psia to 300 psig and most preferably ranging from about 25 psig to 100 psig. The packed sections may utilize packing materials supported by perforated grid or trays.

Although any low pressure relatively inert stripping fluid is considered suitable for purposes of this invention, it is suggested to use upwardly flowing steam as the stripping gas. Steam may be supplied under low pressure through a line 12 to the tube side of a reboiler 14 generating steam that is delivered to the base of the tower via line 16. Alternately, the steam may be directly injected into the base of tower 6 (not shown).

Upon entering port 4, the process condensate flows downwardly through stripping section 8 and at least a portion of the contaminants are stripped from the condensate by steam vapor rising countercurrently through this section. The stripped condensate collected at the closed bottom of tower 6 flows to the shell side of reboiler 14 by means of line 18 and is vaporized generating steam flow to the tower via line 16. The portion of the bottoms liquid not vaporized is withdrawn from the reboiler by means of a bottoms pump 20 and is discharged along line 22 for use in various stages of chemical production. For example, the bottoms liquid of reduced Contaminant content may be used as boiler feed water make-up. Alternatively, the stripped condensate can be used for cooling tower water make-up or may be directly discharged under permit into the municipal sewer system or local waterways with little or no further treatment.

The stripped contaminates in vapor pass upwardly within the tower 6 through rectification section 10. Some of the vapor is recondensed during rectification and flows downwardly within the tower to the stripping section 8 below. The remaining vapor is withdrawn from the top of tower 6 as a concentrated overhead stream. The overhead is delivered along line 24 to condenser 26 whereby the overhead is totally condensed and subcooled. Suitable condensers include, but not by way of limitation, heat exchangers, water coolers and/or air fin coolers for purposes of this invention.

The condensate is then transferred along line 28 to overhead receiver 30 which is preferably a pressure vessel receiver such as that kind conforming with ASME standards. Traces of non-condensables such as dissolved hydrogen gases, for example, may be vented from receiver 30 to the atmosphere along line 32. During start-up of the treatment process, the condensed overhead stream is withdrawn from receiver 30 along line 34 via reflux pump 36 whereby all of the condensed overhead is returned along line 38 as reflux to the top of tower 6. Although any conventional pump may be used for this purposes, an ANSI standard end suction vertical centerline discharge pump such as that available from Goulds Pumps, Inc. out of Seneca Falls, N.Y. or that offered under the tradename Durco™ from The Duriron Company Inc. out of Dayton, Ohio is considered particularly suited to this invention.

Once the contaminates reach concentrated levels within the condensed stream, preferably comparable to about a 30 to 200 fold increase in concentration over that amount in the process condensate fed to the tower along line 2, the condensed overhead stream is split such that a portion of the stream is withdrawn along line 40 at a controlled rate to provide a withdrawn stream of much greater contaminant concentration than the condensate feed. Note that this level of concentration in the withdrawn stream is about 5 to 15 times greater than it is in the overhead vapor from a process condensate stripper with no rectification. To meet this objective, the split stream is generally withdrawn at a controlled rate ranging from 3 and up to about 50% by volume of the total condensed stream. Preferably, the condensate will be withdrawn along line 40 at a rate of about 5 to 20% and most preferably about 10 to 15% by volume of the total stream so as to correspond to a reflux ratio ranging anywhere from 6:1 to 10:1 reflux to withdrawn condensate.

In this manner, the concentration level of the contaminants in the withdrawn stream is so high (having a reduced overall liquid volume) such that the thermal load transferred to the plant upon injection of the withdrawn steam back into the production plant is relatively minor in comparison to what it would be if the stripping tower overhead were totally condensed and injected directly into the plant without concentration (i.e. rectification). The withdrawn concentrated overhead is then recycled back into the plant along line 40 via injection pump 42 at the appropriate stage of the plant's operation so that the contaminants may be decomposed, reused and/or recycled for the production of chemical product.

Figure 2:
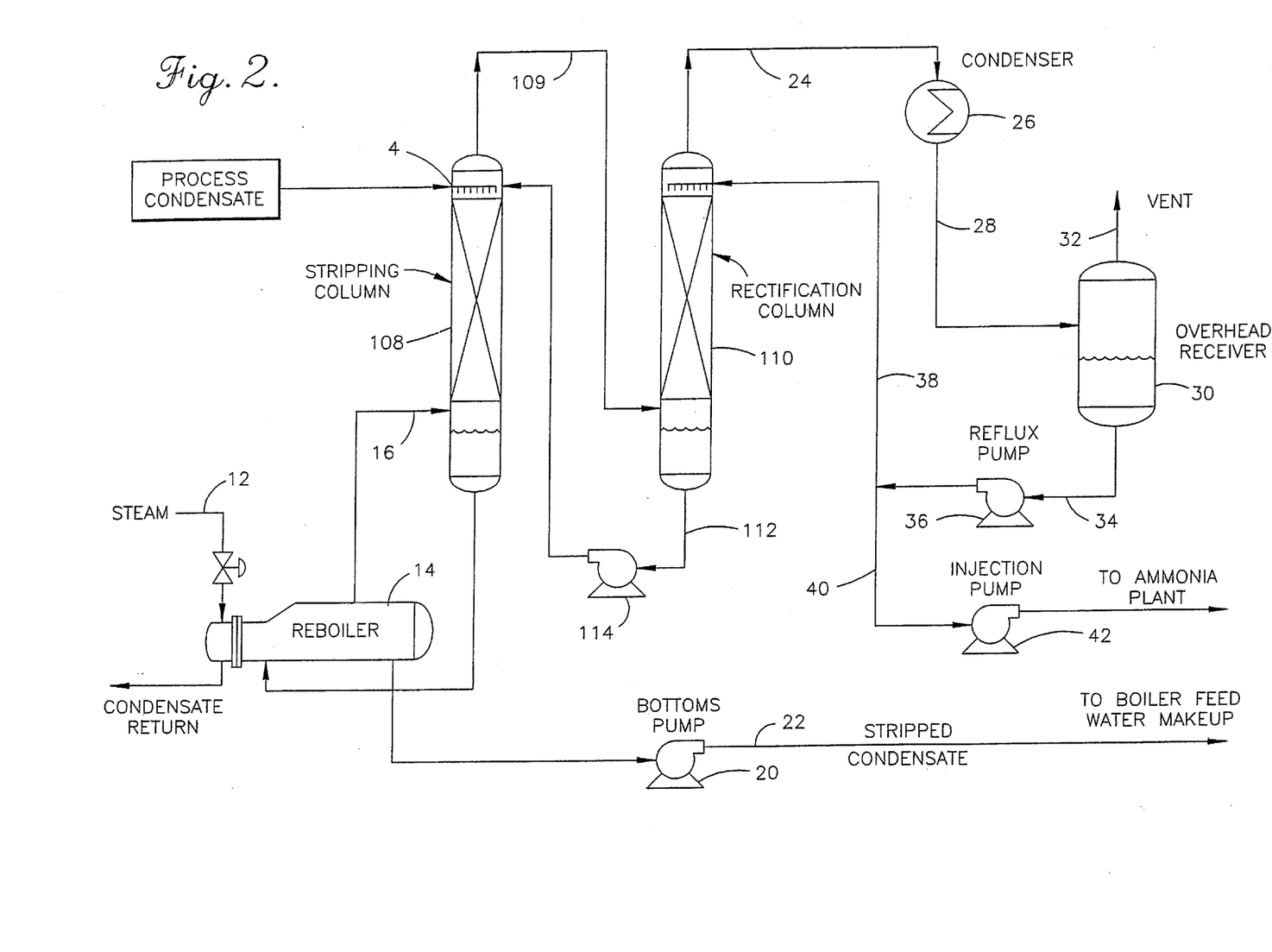
FIG. 2 is a schematic representation of an apparatus configuration having separate stripping and rectification columns in accordance with the present invention.

In an alternative embodiment as shown in FIG. 2, the stripping and rectification steps of the present invention are conducted in two separate columns presented in series. In this embodiment, the process condensate is first introduced along entry port 4 to the top of stripping column 108 and later rectified in separate rectification column 110. Each column 108 & 110 is made of conventional construction as heretofore described preferably being of the cylindrical countercurrent bubble-plate or packed type and operable at relatively low pressure. This embodiment is particularly well adapted for use in retrofitting existing low pressure steam stripping operations wherein the stripping tower is relatively small such that a rectification section cannot be fitted within the existing tower.

As in the first embodiment, steam may be supplied under low pressure to the stripping column 108 through a line 12 to the tube side of a reboiler 14 vaporizing water generating steam that flows to the base of the column via line 16. Alternately, the steam may be directly injected into the base of tower 6 (not shown). Upon entering port 4, the process condensate flows downwardly through stripping column 108 and at least a portion of the contaminants are stripped from the condensate by the steam vapor rising countercurrently through the column. The stripped condensate collected at the closed bottom of tower 6 flows to the shell side of reboiler 14 by means of line 18 where it is vaporized to steam that flows to the tower via line 16. The portion of the bottoms liquid not vaporized is withdrawn from the reboiler by means of a bottoms pump 20 which and is discharged along line 22 for use in various stages of the production facilities.

The contaminant-rich vapor overhead from stripping column 108 is then supplied via line 109 to the base portion of rectification column 110. Some of the vapor is condensed during rectification and, along with reflux, subsequently flows downwardly through the column 110 to provide a bottoms liquid. The bottoms liquid is withdrawn through a line 112 via pump 114 for delivery to the top of stripping column 108 for additional stripping action. The remaining vapor is withdrawn along line 24 as a concentrated stream for subsequent condensation and use as more fully described above in conjunction with the first embodiment.

Another embodiment of the invention is specifically directed to use of the present apparatus and method of using the same for treating ammonia plant process condensate. In this embodiment, the process condensate generally comprises condensate from the reforming stages of ammonia production, water formed in CO shift converters, and secondary condensate recovered from carbon dioxide stripping operations within the plant such as from a Benfield hot potassium carbonate $CO_2$ removal system. The process condensate will include ammonia in an amount ranging anywhere from 500 to 2,000 parts per million (ppm) by weight of the condensate, methanol in amounts ranging from about 100 to 800 ppm by weight of the condensate, as well as trace amounts of other by-products, raw materials and impurities such as alkylamines and dissolved nitrogen and hydrogen gas. The process condensate may be utilized for purposes of this invention at its recovery temperature (recovery from the plant) which generally ranges from 150° to 250° F. and is most preferably at a temperature near the bubble point of the condensate for the tower operation pressure.

Figure 3:
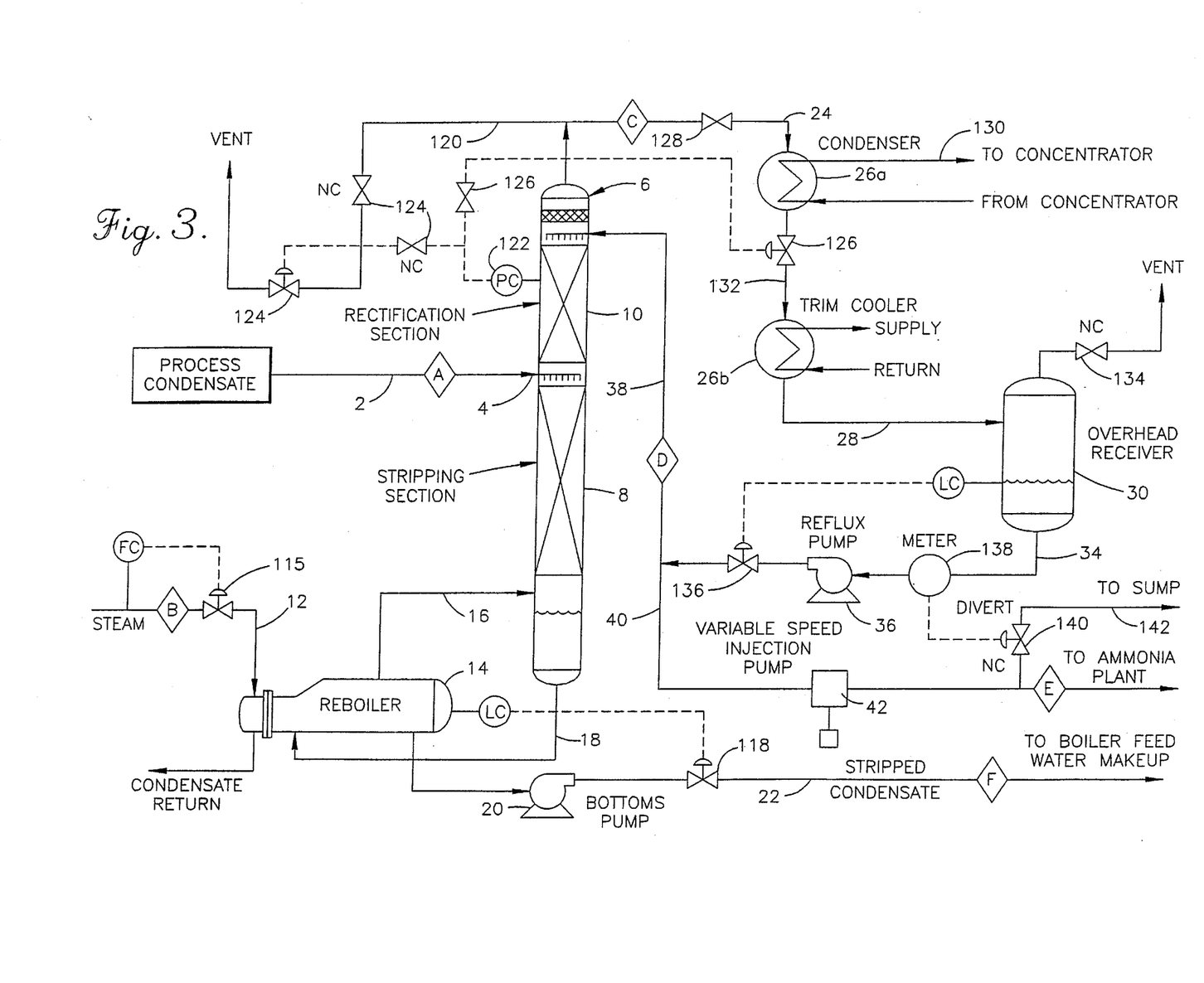
FIG. 3 is a schematic representation of a preferred embodiment of the invention of FIG. 1, wherein the apparatus is provided for the treatment of ammonia plant process condensate.

Looking to FIG. 3, the ammonia plant process condensate is fed via line 2 to an entry port 4 in the midsection of an upright cylindrical tower 6 comprising a lower stripping section 8 and an upper rectification section 10. The tower is of conventional construction as heretofore described in the first embodiment operable at relatively low pressures ranging generally from 0 psia to 300 psig and most preferably ranging from about 10 to 100 psig. Steam is supplied under low pressure through a line 12 to the tube side of a reboiler 14 with flow to the reboiler being controlled by flow control valve 115 generating steam in the reboiler which is delivered to the base of the tower via line 16.

Upon entering port 4, the process condensate flows downwardly through stripping section 8 and the contaminants are stripped from the condensate by steam vapor rising countercurrently through this section. The stripped condensate collected at the closed bottom of tower 6 flows to the shell side of reboiler 14 by means of line 18 and is vaporized generating steam to the tower via line 16. A portion of the bottoms liquid is withdrawn from the reboiler controlled by a level control valve 118 by means of a bottoms pump 20 which and is discharged along line 22 for use as boiler feed water make-up or cooling tower water make-up in the ammonia plant.

The stripped contaminate-rich vapor passes upwardly within the tower through rectification section 10. Some of the vapor is recondensed during rectification and flows downwardly within the tower to the stripping section 8 below. The remaining vapor is withdrawn from the top of tower 6 as a concentrated overhead stream. During initial start-up of the system, the overhead from tower 6 is diverted along line 120 and vented to the atmosphere until the pressure and composition of the overhead stream approach design conditions within the rectification section 10 of tower 6. This pressure is controlled by pressure controller 122 which is connected to valves 124 and valves 126 such that until equilibrium is reached, the overhead will flow along line 120 with flow via line 24 to the condenser blocked by valve 128. Once equilibrium is reached, line 120 is closed and line 24 opened.

The overhead is then delivered along line 24 to first condenser 26a whereby the overhead stream is totally condensed. First condenser 26a is in the form of a heat exchanger, wherein the preferred coolant is a dilute solution of ammonium nitrate which upon heating will then be delivered to a concentrator (not shown) in the ammonia plant. A complete description of such a concentrator system appears in Holiday, System Curbs Nitrogen in Plant-Effluent Streams, CHEMICAL ENGINEERING (Aug. 14, 1978) incorporated herein by reference. In this embodiment, the waste water stream from the concentrator is thus used for heat exchange with the tower overhead stream and the heated cooling water is then recycled along line 130 back to the concentrator for reuse. Although direct heat exchange is contemplated for use in this embodiment, indirect heat exchange is deemed suitable for these purposes and may be advisable in certain circumstance to eliminate the risk of leakage of the waste water stream into the overhead stream. An indirect heat transfer system would of course require additional equipment such as an additional holding tank, fluid pump and heat exchanger.

It should be understood that the cooling fluid stream of the heat exchanger could have its source in any number of plant operations, whereby the heated stream may be returned for recycled use in the plant. Alternately, cooling tower water can be used in the heat exchangers to condense the overhead. In another alternate condensing mode, an air fin condenser could be used.

After condensing, the condensate is directed along line 132 and is further subcooled to reduce the vapor pressure in trim cooler 26b preferably to a temperature ranging from 100° to 150° F. with a vapor pressure ranging from 2 to 8 psia. The subcooled condensate is then directed along line 28 to receiver 30 wherein normally closed valve 134 may be opened to allow traces of non-condensables in the condensed overhead to be vented to the atmosphere. This valve may be operated manually or by monitoring the pressure within the receiver. The condensate is withdrawn from the receiver 30 in conjunction with level control valve 136 at a rate corresponding with the level of fluid collected within the receiver.

In the embodiment shown in FIG. 3, a meter 138 is provided along line 34 to monitor the content of the condensed overhead stream as it exits the overhead receiver 30 to assure that the condensed stream is free of any unwanted contaminates. For example, ammonium nitrate contained in the heat exchanger loop described above could potentially leak into the stream during heat exchange. The presence of such ammonium nitrate could be detrimental to the operation of the ammonia plant if recycled to the plant as is contemplated by this invention. Thus a meter of any type deemed suitable for purposes of recognizing unwanted contaminates is connected to diversion valve 140 which is normally closed. Should any unwanted contaminates be present in the condensed stream, the stream will automatically stop feeding line 40 and instead be diverted along line 142 to a sump or other waste containment region. In this manner, the integrity of the ammonia plant process is not in any way jeopardized by the injection of the condensed stream into the ammonia plant. In a preferred embodiment, when the heat exchanger coolant above is provided from the ammonia plant concentrator, meter 138 is an ion specific electrode for nitrate.

Initially, all of the condensed overhead withdrawn from receiver 30 is returned to the top of tower 6 as reflux until the contaminates reach concentrated levels within the condensed stream, preferably comparable to about a five to fifteen fold increase in concentration over that amount of contaminants that would be in a conventional stripper overhead steam vent. This concentration is about 40 to 120 times greater than in the process condensate feed to the tower. The condensed overhead stream is then split such that a portion of the stream is withdrawn along line 40 preferably at a rate of about 5 to 20% and most preferably about 10 to 15% by volume of the total stream so as to correspond to a reflux ratio ranging anywhere from 6:1 to 10:1 reflux to withdrawn condensate. As is shown in Table I below, in a most preferred embodiment of the invention, the condensed stream is withdrawn at a reflux rate of about 8:1 reflux to withdrawn condensate.

The withdrawn concentrated overhead is then recycled back into the ammonia plant along line 40 via injection pump 42 at different stages of the ammonia production operation. Although it should be understood that the concentrated overhead stream may be utilized in any manner deemed suitable, in one embodiment of the invention the concentrated stream is fed along line 40 and injected to the gas and steam mixed feed coil of the primary reformer or to the air preheat coil of the secondary reformer of the plant. In any event, in order to eliminate any pressure penalties on the ammonia plant, the concentrated stream should be injected back into the plant under pressures on the order of 500 to 600 psi, or to any other pressure equivalent to the pressure of the stream in which it is placed.

For these purposes, injection pump 42 is preferably a high differential pressure positive displacement reciprocating pump having a variable frequency motor such those manufactured by Union Pump Company out of Michigan, Wilson Snyder Pumps out of Texas or Milton Roy Co. out of Pennsylvania. These pumps are preferred to assure that the condensed overhead is efficiently withdrawn at a relatively low rate in accordance with the present invention, and delivered to the ammonia feed coil at relatively high pressures. Of course a high speed centrifugal pump could also be used for purposes of this invention, but may be less efficient in view of the low rate of withdrawal required.

It should be understood that during the practice of this invention, various systems and apparatus can be employed to monitor and control the rate of flow of the processed streams and the temperature and vapor pressure of these streams. Such control systems may be based upon a valve operations as shown in FIG. 3 hereof, by computer calculations and/or manual adjustments.

The apparatus used for purposes of the invention may generally be comprised of any relatively chemically inert, durable materials such as carbon steel, stainless steel, certain polymers and metal alloys known in the art. It should be understood that the apparatus including the towers, pumps, condensers, valves, receivers, and boilers are conventional and may be generally dimensioned to meet that task at hand taking into consideration the volume of vapor and liquid flow being processed and size of the ammonia processing plant.

TABLE I

EXAMPLE MATERIAL BALANCE OF AN OPERATING CONDITION USING THE APPARATUS CONFIGURATION OF FIG. 3

|  | A | B | C | D | E | F |
|---|---|---|---|---|---|---|
| Water, Lbs/Hr | 149,740 | 32,700 | 24,676.29 | 21,934.48 | 2,741.81 | 146,998.19 |
| Ammonia, Lbs/Hr | 225 |  | 2,023.65 | 1,798.80 | 224.85 | 0.15 |
| Methanol, Lbs/Hr | 35 |  | 300.06 | 266.72 | 33.34 | 1.66 |
| Total, Lbs/Hr | 150,000 | 32,700 | 27,000 | 24,000 | 3,000 | 147,000 |
| Pressure, PSIG | 28 | 50 | 29 | 60 | 650 | 30 |
| Temp, °F. | 238 | 297 | 234 | 120 | 120 | 274 |

TABLE II

PERFORMANCE FOR VARIED OVERHEAD WITHDRAWAL RATES CALCULATED FOR APPARATUS CONFIGURATION OF FIG. 3

| Overhead Withdrawal Rate #/Hr[1] | 3000 | 917 |
|---|---|---|
| Reflux Ratio | 8.0 | 27.5 |
| NH$_3$ in Withdrawn Overhead | 7.5 | 24.5 |
| MeOH in Withdrawn Overhead | 1.1 | 3.6 |
| NH$_3$ in Bottoms, ppm[2] | 1.0 | 1.75 |
| MeOH in Bottom, ppm[2] | 11.3 | 14.1 |
| % of Flood | 80 | 80 |
| Theoretical Stages | 12 | 12 |

[1]Pumped to ammonia plant (stream E in FIG. 3)
[2]Concentrations in stripped condensate (stream F in FIG. 3)

Pumped to ammonia plant (stream E in FIG. 3) Concentrations in stripped condensate (stream F in FIG. 3)

The invention is further illustrated by the following example which is illustrative of certain embodiments designed to teach those of ordinary skill in the art how to practice the invention, and to represent the best mode contemplated for carrying out this invention.

EXAMPLE 1

RETROFITTING EXISTING LOW PRESSURE STRIPPING OPERATION

A conventional low pressure stripping system for treating process condensate from an ammonia plant was retrofitted in accordance with the present invention. The existing system comprised a stripping tower of a carbon steel column design by Chemical Construction Company, having an internal design pressure of 155 psig at 450° and being 5' 6"in diameter by 54'by 10"tangent to tangent for condensate stripping. The tower was packed with two sections of one inch Flexirings™ packing, a product of Koch Engineering Company out of Wichita, Kansas, wherein the bottom packed section of the tower had 20'depth and the top packed section was 18'2"in depth. Other tower internals including packing bed supports, liquid distributors, packing hold downs and demisters. A used kettle type reboiler was placed into service to indirectly provide stripping steam. The column boil up rate was controlled by steam to the reboiler on flow control. Column pressure control was by a pressure control valve on the overhead vapor. The overhead vapor containing steam, ammonia, methanol, and traces of alkylamines was vented to the atmosphere.

The stripping tower was revamped in accordance with the process calculations for the hydraulic loads appearing in Tables I and II above indicating that twelve theoretical stages were required to accomplish the flow sheet separation with the reflux ratio desired. Approximately two stages were needed in the enriching rectification section and ten were deemed required in the stripping section. The height equivalent to a theoretical stage or plate, HETP, was calculated to be about 2.5 to 3.0 feet based on actual column process performance data with one inch Flexirings™ in a stripping configuration. This resulted in a retro-fit process design of 30' of one inch Flexirings™ in the stripping section and 6' 3" of one inch Flexirings™ in the rectification section. A redistributor was located midway in the depth of the stripping section.

The tower was modified for process condensate feed at the top of the stripping section (column midsection) and reflux to the top of the rectifying section. One inch Flexirings™ were used for tower packing and the internals of the columns were provided by Koch Engineering. These internals include packing supports, liquid feed distributors, hold downs, redistributors, and demister. Equivalent packing is also available such as ballast rings by Glitch or High-Pack™ Packing by Norton.

The reboiler and steam control method remained unchanged when revamping from stripping only to combination rectification-stripping. Steam rate to the reboiler and the revamped stripper rectifier configuration remains essentially the same as it was in a stripping only configuration.

From the foregoing it should be understood that this invention is one well adapted to attain all ends and objects herebefore set forth together with the other advantages which are obvious and which are inherent to the structures and apparatus.

It will be understood that certain features and subcombinations are of utility and may be employed without reference to other feature and subcombinations. This is contemplated by and is within the scope of the amended claims.

Since many possible embodiments may be made of the invention without departing from he scope thereof, it is to be understood that all matter herein set forth or shown in the accompanying drawing is to be interpreted as illustrative and no in a limiting sense.

What is claimed:

1. An apparatus for treating the process condensate of an ammonia or methanol chemical production plant, said apparatus comprising:

a stripping section having a top and a closed bottom;

a feed supply line from said chemical production plant to said stripping section;

a stripping vapor delivery line for delivering stripping vapor to the bottom of the stripping section;

a stripping bottoms removal line for removing bottoms liquid from said bottom of said stripping section;

a rectification section having a closed top and a bottom in fluid flow contact with said stripping section;

a condenser;

a rectification overhead withdraw line from said rectification section to said condenser;

a reflux line from said condenser to said rectification section; and a concentrated condensate removal line from said reflux line to a reformer within said chemical production plant.

2. An apparatus according to claim 1, wherein said reformer is selected from the group consisting of the primary reformer of an ammonia plant, the secondary reformer of an ammonia plant and the reformer of a methanol plant.

3. An apparatus according to claim 2, wherein said apparatus additionally comprises a pressurized feed coil between said reflux line and said reformer, said pressurized feed coil selected from the group consisting of a mixed hydrocarbon-steam feed coil which feeds into the primary reformer of an ammonia plant, an air preheat coil which feeds into the secondary reformer of an ammonia plant, and a mixed hydrocarbon-steam feed coil which feeds into the reformer of a methanol plant.

4. An apparatus according to claim 1, wherein said stripping section and said rectification section are housed one above another respectively in a common tower permitting vapor from said stripping section to pass upwardly within said common tower to said rectification section above and condensate from each section to pass downwardly within said common tower.

5. An apparatus according to claim 4, wherein said common tower comprises a countercurrent tower selected from the group consisting of trayed and packed towers.

6. An apparatus according to claim 5, wherein said common tower is operable at pressures ranging generally from 0 psia to 300 psig.

7. An apparatus according to claim 1 wherein said stripping section and said rectification section each comprise separate columns in series.

8. An apparatus according to claim 7, wherein said apparatus additionally comprises:

a stripping overhead withdraw line from said stripping section to said rectification section; and a rectification bottoms removal line from said bottom of said rectification section to said stripping section.

9. An apparatus according to claim 8, wherein said apparatus additionally comprises a rectification bottoms return pump on the rectification bottoms removal line for pumping bottoms liquid from said rectification section to said stripping section.

10. An apparatus according to claim 1 wherein said apparatus additionally comprises the following:

a reboiler having a tube side and a shell side, said stripping vapor delivery line being connected to said reboiler and said stripping bottoms removal line being connected to the shell side of said reboiler;

a steam supply line for supplying steam to said tube side of said reboiler; and a reboiler bottoms removal line for removing bottoms liquid from said reboiler.

11. An apparatus according to claim 10, wherein said apparatus additionally comprises a bottoms removal pump for pumping bottoms liquid from said reboiler.

12. An apparatus according to claim 1, wherein said condenser is selected from the group consisting of heat exchangers, water coolers and air fin coolers.

13. An apparatus according to claim 1, wherein said apparatus additionally comprises an overhead receiver on the reflux return line between said condenser and said rectification section.

14. An apparatus according to claim 13, wherein said overhead receiver comprises a pressure vessel receiver, said overhead receiver having a vent through which non-condensables may be vented from the receiver to the atmosphere and having a level control valve to control the rate of reflux withdrawn from said overhead receiver along said reflux line.

15. An apparatus according to claim 13, wherein said apparatus additionally comprises a reflux return pump on said reflux return line between said overhead receiver and said rectification section for pumping fluid from said overhead receiver to said rectification section.

16. An apparatus according to claim 15, wherein said reflex return pump comprises a standard end suction vertical centerline discharge pump.

17. An apparatus according to claim 1, wherein said apparatus additionally comprises a concentrated condensate removal pump on said concentrated condensate removal line for pumping concentrated condensate from said reflux return line to said reformer in said chemical production plant.

18. An apparatus according to claim 17, wherein said concentrated condensate removal pump is an injection pump.

19. An apparatus according to claim 1, wherein said apparatus additionally comprises the following:

a start-up diversion line from said rectification overhead withdraw line to the atmosphere;

a pressure controller for monitoring the pressure of overhead along the rectification overhead withdraw line;

a valve connected to said pressure controller and said start-up diversion line; and a valve connected to said pressure controller and said rectification overhead withdraw line and positioned between said start-up diversion line and said condenser.

20. An apparatus according to claim 13, wherein said apparatus additionally comprises a subcooler on said reflux line between said condenser and said overhead receiver and wherein said condenser comprises a heat exchanger.

21. An apparatus according to claim 20, wherein said apparatus further comprises:

a concentrator in said chemical production plant; and a heat exchange supply line extending from said concentrator through said heat exchanger and back to said concentrator for circulating coolant from said concentrator through said heat exchange supply line, the coolant being preheated by the heat exchanger and returned to said concentrator along the heat exchange supply line.

22. An apparatus according to claim 13, wherein said apparatus additionally comprises:

a meter on said reflux line between said overhead receiver and said concentrated condensate removal line for monitoring the quality of the concentrated condensate as it exits said overhead receiver;

a waste receiver for receiving concentrated condensate of unacceptable quality;

a reflux diversion line from said reflux line or said concentrated condensate removal line to said waste receiver; and a reflux diversion valve connected to said meter on said reflux diversion line.

23. An apparatus for treating the process condensate of an ammonia or methanol chemical production plant, said apparatus comprising:

a common tower having a closed top and closed bottom comprising a stripping section and a rectification section housed one above another respectively in said common tower permitting vapor from said stripping section to pass upwardly within said common tower to said rectification section above and condensate from each section to pass downwardly within said common tower;

a feed supply line from said chemical production plant to said common tower;

a stripping vapor delivery line for delivering stripping vapor to the bottom of said common tower;

a stripping bottoms removal line for removing bottoms liquid from said bottom of said common tower;

a bottoms removal pump on said bottoms removal line for pumping bottoms liquid from said common tower;

a condenser;

a rectification overhead withdraw line from said rectification section of the common tower to said condenser;

a reflux line from said condenser to said rectification section of said common tower;

a reflux return pump on said reflux return line between said condenser and said rectification section for pumping fluid from said condenser to said rectification section;

a concentrated condensate removal line from said reflux line to a reformer within said chemical production plant; and a concentrated condensate removal pump on said concentrated condensate removal line for pumping concentrated condensate from said reflux return line to said reformer in said chemical plant at a controlled rate.

24. An apparatus according to claim 23, wherein said common tower is operable at pressures ranging generally from 0 psia to 300 psig.

25. An apparatus according to claim 23, wherein said apparatus additionally comprises an overhead receiver on the reflux return line between said condenser and said rectification section.

26. An apparatus according to claim 23, wherein said stripping vapor delivery line delivers live steam for injection into said bottom of said common tower.

27. An apparatus according to claim 23, wherein said apparatus additionally comprises the following:

a start-up diversion line from said rectification overhead withdraw line to the atmosphere;

a pressure controller for monitoring the pressure of overhead along the rectification overhead withdraw line;

a valve connected to said pressure controller and said start-up diversion line; and a valve connected to said pressure controller and said rectification overhead withdraw line and positioned between said start-up diversion line and said condenser.

28. An apparatus according to claim 25, wherein said apparatus additionally comprises a subcooler on said reflux line between said condenser and said overhead receiver and wherein said condenser comprises a heat exchanger.

29. An apparatus according to claim 23, wherein said apparatus further comprises:

a concentrator in said chemical production plant; and a heat exchange supply line extending from said concentrator through said heat exchanger and back to said concentrator for circulating coolant from said concentrator through said heat exchange supply line, the coolant being preheated by the heat exchanger and returned to said concentrator along the heat exchange supply line.

30. An apparatus according to claim 29, wherein said apparatus additionally comprises:

a meter on said reflux line for monitoring the quality of the concentrated condensate;

a waste receiver for receiving concentrated condensate of unacceptable quality;

a reflux diversion line on said reflux line between said condenser and said concentrated condensate removal line to said waste receiver; and a reflux diversion valve connected to said meter on said reflux line adjacent said reflux diversion line.

31. An apparatus according to claim 23, wherein said apparatus additionally comprises:

a reboiler having a tube side and a shell side, said stripping vapor delivery line being connected to said reboiler and said stripping bottoms removal line being connected to the shell side of said reboiler;

a steam supply line for supplying steam to said tube side of said reboiler;

a reboiler bottoms removal line for removing bottoms liquid from said reboiler and wherein said bottoms removal pump is on said reboiler bottoms removal line.

32. An apparatus according to claim 23, wherein said apparatus additionally comprises a bottoms removal pump for pumping bottoms liquid from said reboiler.

33. An apparatus for treating the process condensate of an ammonia or methanol chemical production plant, said apparatus comprising:

a stripping section having a top and a closed bottom;

a feed supply line from said chemical production plant to said stripping section;

a stripping vapor delivery line for delivering stripping vapor to the bottom of the stripping section;

a stripping bottoms removal line for removing bottoms liquid from said bottom of said stripping section;

a rectification section having a closed top and a bottom in fluid flow contact with said stripping section;

a bottoms removal pump for pumping bottoms liquid from said stripping section;

a condenser;

a rectification overhead withdraw line from said rectification section to said condenser;

a reflux return line from said condenser to said rectification section;

an overhead receiver on the reflux return line between said condenser and said rectification section;

a reflux return pump on said reflux return line between said overhead receiver and said rectification section for pumping fluid from said overhead receiver to said rectification section;

a concentrated condensate removal line from said reflux line to a reformer within said chemical production plant; and a concentrated condensate removal pump on said concentrated condensate removal line for pumping concentrated condensate from said reflux return line to said reformer within said chemical plant at a controlled rate.

34. An apparatus according to claim 33, wherein said stripping section and said rectification section each comprise separate columns in series and said apparatus additionally comprises:

a stripping overhead withdraw line from said stripping section to said rectification section; and a rectification bottoms removal line from said bottom of said rectification section to said stripping section; and a rectification bottoms return pump on the rectification bottoms removal line for pumping bottoms from said rectification section to said stripping section.

* * * * *